(No Model.)

G. HABIG.
CHEESE SAFE.

No. 538,070.  Patented Apr. 23, 1895.

Witnesses
V. M. Hood.
J. F. Schmidt.

Inventor
George Habig.
By Attorney
H. P. Hood.

UNITED STATES PATENT OFFICE.

GEORGE HABIG, OF COLUMBUS, INDIANA.

CHEESE-SAFE.

SPECIFICATION forming part of Letters Patent No. 538,070, dated April 23, 1895.

Application filed February 11, 1895. Serial No. 537,937. (No model.)

*To all whom it may concern:*

Be it known that I, GEORGE HABIG, a citizen of the United States, residing at Columbus, in the county of Bartholomew and State of Indiana, have invented a new and useful Improvement in Cheese-Safes, of which the following is a specification.

My invention relates to an improved cheese-safe for the use of grocers and other retailers. The object of my invention is to provide a convenient support and cover for a single cheese, so arranged that the cheese may be conveniently put into position and then covered so as to protect it from flies and dust; the cover being so constructed that convenient access may be had to the cheese for cutting pieces therefrom.

The accompanying drawings illustrate my invention.

Figure 3:
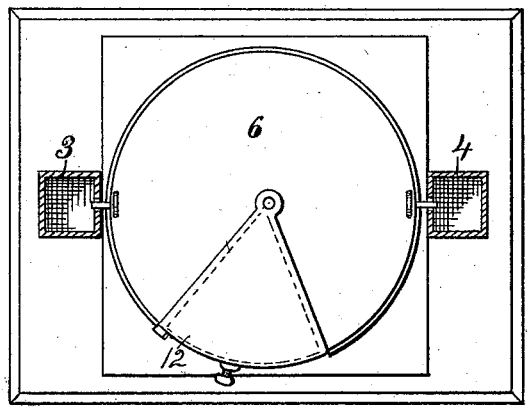
Figure 4:
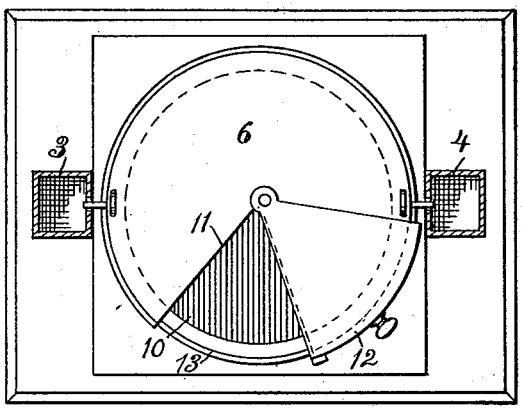
Figure 1:
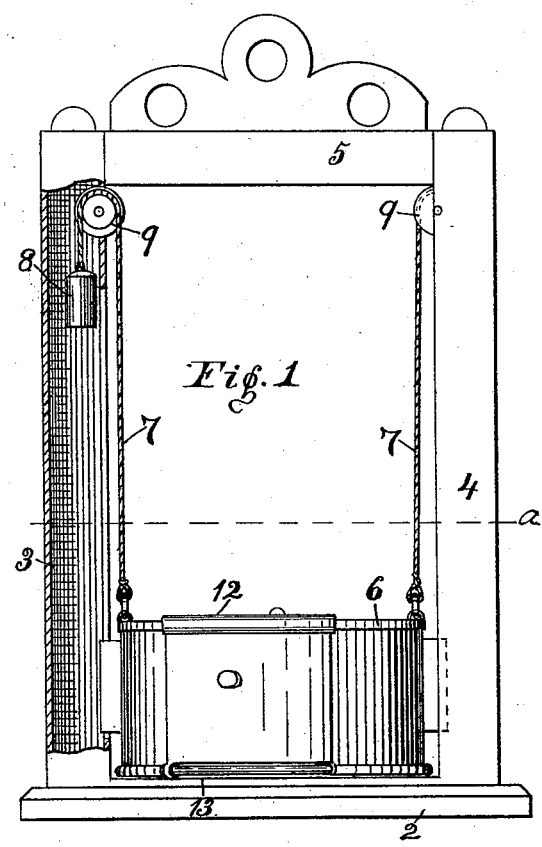
Figure 2:
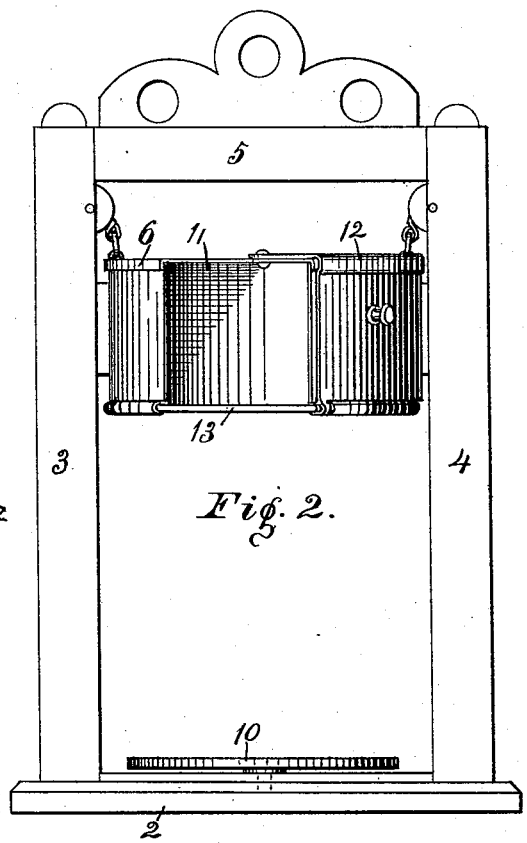

Figure 1 represents a side elevation of my device, partly in section, showing the cover closed. Fig. 2 represents a similar elevation, showing the cover raised so that the cheese may be placed in position, and the swinging section thereof open. Fig. 3 represents a section at —a— Fig. 1. Fig. 4 represents a similar section, showing the swinging section of the cover open to permit access to the cheese.

In the drawings, 2, indicates a flat board which forms the base of a frame consisting of the said base, a pair of hollow upright columns, 3, and 4, erected thereon, and connected at the top by a cross-beam, 5.

A cylindrical cover, or receptacle, 6, closed at the top and open on the under side and formed preferably of sheet metal, is suspended so as to be raised or lowered in the frame, by means of cords, 7, 7, to each of which is attached a weight, 8, said cords passing over suitable guide-pulleys, 9, 9, so that the weights are suspended within the columns 3 and 4, and operate to counter-balance the cover. Mounted upon the base, between the columns and concentric with the cover, is a circular turn-table, 10, which is pivoted to the base so as to revolve thereon in a horizontal plane.

The arrangement of the cover 6 is such that its lower edge may rest upon the base, so as to effectually cover and protect the cheese, or it may be raised to the position shown in Fig. 2, and there sustained by the counterweights.

For the purpose of providing convenient means of access to the cheese when small pieces are to be cut therefrom, I form a segmental opening, 11, in the top and one side of the cover, which opening is provided with a swinging segmental door, 12, which is pivoted to the top of the cover so as to swing in a horizontal plane, and is supported at its lower edge by a guide-rod, 13, which extends across the lower edge of the opening and forms a binding for the lower edge of the cover.

For the purpose of causing door 12 to close tightly over the opening and also open easily and swing clear of the side of the cover, the pivot, upon which the door is mounted, is placed eccentric to the circumference of the cover 6, so that in opening, the vertical side of the door moves outward and away from the vertical wall of cover 6, and moves toward the wall in closing.

In operation, cover 6 is raised as in Fig. 2, and the cheese, (not shown,) is placed on the turn-table 10. The cover is then lowered to the position shown in Fig. 1, thus completely inclosing the cheese. By swinging door 12 to one side, as shown in Figs. 2 and 4, slices may be cut from the cheese, as desired for retailing, without raising the cover.

I am aware that cheese safes have before been made consisting of a vertically sliding counter-balanced cover; and I am also aware that cheese safes have before been made consisting of a cover having a segmental opening, a turn-table mounted beneath said cover, and a segmental door attached to said turn-table and pivoted to the cover so as to swing inside thereof, and concentrically therewith, and I do not claim either of said constructions.

I claim as my invention—

The above described cheese safe, consisting of the base 2, hollow columns 3 and 4, connected by cross-beam 5, and provided with guide pulleys 9, 9, turn-table 10 mounted on said base, cylindrical cover 6, open at its under side and suspended between said columns by cords 7, 7, passing over guide-pulleys and attached to weights, said cylindrical cover having segmental opening 11 provided at its lower edge with the guide rod 13, and the segmental door 12 pivoted to the outside of said cover and engaging said guide bar, the pivot which connects said door to the cover being
5 arranged eccentrically with the circumference of the cover, whereby said door is caused to fit the cover closely when shut, and is moved outward therefrom when opened, all arranged to co-operate in the manner and for the purpose set forth.

GEORGE HABIG.

Witnesses:
WM. L. COX,
JAMES F. COX.